Figure 1:
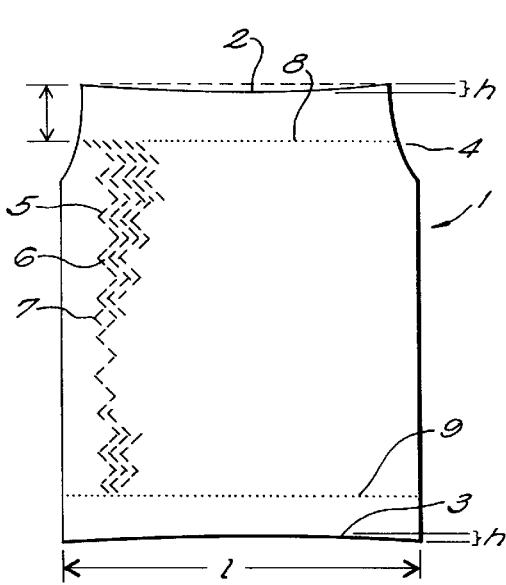

United States Patent
Ramm-Schmidt et al.

[19]

[11] Patent Number: 5,927,383
[45] Date of Patent: Jul. 27, 1999

[54] HEAT EXCHANGER AND A METHOD FOR PRODUCING THE SAME

[75] Inventors: Leif Ramm-Schmidt, Kirkkonummi; Veli Tiainen, Klaukkala; Peter Koistinen, Espoo, all of Finland

[73] Assignee: Hadwaco Ltd Oy, Helsinki, Finland

[21] Appl. No.: 09/051,261

[22] PCT Filed: Oct. 2, 1996

[86] PCT No.: PCT/FI96/00519

§ 371 Date: Apr. 3, 1998

§ 102(e) Date: Apr. 3, 1998

[87] PCT Pub. No.: WO97/13112

PCT Pub. Date: Apr. 10, 1997

[30] Foreign Application Priority Data

Oct. 3, 1995 [FI] Finland ................................. 954701

[51] Int. Cl.⁶ .................................................. F28F 7/00
[52] U.S. Cl. .......................... 165/46; 165/115; 159/13.3; 159/28.6
[58] Field of Search .................. 165/46, 115, 170, 165/111; 159/13.3, 28.6

[56] References Cited

U.S. PATENT DOCUMENTS

| | | | |
|---|---|---|---|
| 2,566,929 | 9/1951 | Lopker | 165/115 X |
| 3,371,709 | 3/1968 | Rosenblad | 165/115 |
| 4,216,820 | 8/1980 | Andrew | 165/115 |
| 4,893,669 | 1/1990 | Kashiwada et al. | 165/115 X |
| 5,340,443 | 8/1994 | Heiniö et al. | |
| 5,512,141 | 4/1996 | Koistinen et al. | 159/13.3 X |

FOREIGN PATENT DOCUMENTS

| | | |
|---|---|---|
| 86961 | 8/1994 | Finland . |
| 00068 | 2/1979 | WIPO . |
| 10416 | 5/1993 | WIPO . |

*Primary Examiner*—Leonard Leo
*Attorney, Agent, or Firm*—Lahive & Cockfield, LLP

[57] ABSTRACT

The method relates to a film heat exchanger and a method for constructing the same. The heat exchanger comprises bags (1) made of film material in order to transfer heat from the steam to be condensated inside the bags to the liquid to be evaporated on the outer surfaces (18) thereof, as well as feed channel arrays for distributing steam (10) and liquid onto the internal and external heat transfer surfaces of the bags. According to the invention, inside the top end (2) of each bag (1), there is provided an essentially straight strip (11) bordering the steam channels (10), to which strip the bag is fastened; in connection with the fastening, the top edge of the bag is pulled straight by bending the bag, so that the middle part of the bag is raised in relation to the sides (12) thereof, and the thus straightened edge is then attached to the strip provided inside the bag. Respectively, the bottom edge (3) of the bag can be cut to be upwardly concave and fastened, after straightening, to a strip (15) fitted inside the bottom end of the bag, and comprising condensate removal channels (14). When straightening the top and bottom edges (2, 3) of the bag, there are created horizontal folds (13) in the film material, which folds serve as an inflation margin while pressurizing the bag.

10 Claims, 1 Drawing Sheet

HEAT EXCHANGER AND A METHOD FOR PRODUCING THE SAME

The present invention relates to a heat exchanger comprising bags made of film material for transferring heat from the steam being condensated inside the bags to the liquid being evaporated on the outer surfaces of the bags, as well as feed channel arrays provided at the top end of the bags for distributing the steam and liquid on the heat transfer surfaces both inside and outside the bags.

The Finnish publication print 86,961 describes a heat exchanger composed of plastic film bags, said heat exchanger being designed for distilling sea water or for concentrating various solutions or suspensions. The bags provided with liquid and steam channel systems are bound together to form a package, where the liquid under treatment is conducted to evaporate on the outer surfaces of the bags, whereafter the evaporation steam is compressed in a compressor to higher pressure and temperature and is conducted to inside the bags to serve as heating steam, which in the heat transfer is condensated back into liquid.

The FI patent application 944,472, related to the present invention in a way stipulated under section 2, subsection 2 of the Patent Law, describes a construction comprising feed channel systems for liquid and steam, provided at the top end of the bags and suited to be used in a heat exchanger operating according to the principle described in the FI publication 86,961. According to said application, the channel systems are realized by means of interconnected elements, every second of which is located inside the bag end, and every second outside the bag, and where the fastening means are notches and grooves, wherebetween the film surfaces of the bags are locked. By means of the notches and grooves, the films are thus folded; the folds make the bags narrower in the transversal direction thereof, at the same time creating an expansion margin in order to prevent the bags from stretching or tearing due to the effect of the pressurized heating steam fed therein.

The FI patent application 953,182, which is likewise related to the present invention in a way stipulated under section 2, subsection 2 of the Patent Law, further describes a structural solution for the liquid and steam feed channels, wherein the bags, at the top ends whereof there are provided internal steam feed strips, are removably attached to a common channel frame containing both steam and liquid channels. Also in this case the folding of the bag film material is realized by means of notches or grooves provided in said strips.

In the prior art solutions described above, difficulties may occur when bending the film material to conform to the notches or grooves of the elements or strips forming the liquid or steam channels in order to fold the material in a desired fashion. It may easily happen that the plastic film arranged in between or around the elements or strips gives way by stretching, in which case the desired corrugation is not achieved.

The object of the present invention is to provide an alternative solution, as compared to the ones mentioned above, for connecting bags made of film material to the steam channels located at the top end of a heat exchanger, in which case we achieve a simple and compact structure, and said stretching problem of the films can be avoided. The heat exchanger according to the invention is characterized in that at the top end of each bag, inside the bag, there is fitted an essentially straight strip bordering the steam channels to which strip the bag is fastened, and that in connection with the fastening, the bag has been shaped for improving its inflatability by cutting the top edge of the bag to be concave, and by thereafter pulling it straight, so that the middle part of the bag is raised in relation to the sides, and by attaching the thus straightened edge to the internal strip provided in the bag.

According to the invention, the sides of the steam-channel-bordering strips provided inside the bags are essentially straight plane surfaces, i.e. clear of all possible notches and/or grooves used in the prior art solutions for fastening the liquid and steam feed elements to each other, in which case the film material of the bags attached to the strips cannot stretch. The raising the middle part of the bag in relation to the sides results in that the bag sides contain somewhat more film material, and as a consequence the inflation and tension caused by the steam are distributed evenly, without remarkable tension differences between the middle and side areas of the bag. The heat exchanger according to the invention utilizes the capacity of the heat transfer surfaces of the bags along the whole width thereof, prevents any stretching or tearing of the film material of the bags and keeps the steam feed channels and the interior of the inflated bag open, so that blockages disturbing the steam feed are not created.

According to the invention, the cutting of the top end of the bag can be carried out so that the depth of the arch created therein is about 1–4%, advantageously about 2–3%, of the with of an uninflated bag.

Each pair of films of a bag may be seamed together at vertically proceeding seams, which divide the internal space of the bag into respective vertical sections. Advantageously the seams are designed to follow a zigzagging pattern, and they include interruptions, at which adjacent sections are connected to each other. In the heat exchanger according to the invention, the pressurized heating steam conducted to the bags inflates said sections evenly along the whole width of the bags.

The bags serving as heat transfer elements according to the invention can also be deformed at the bottom end thereof, in respective fashion as at the top end thereof. In this case the bottom end of each bag is shaped by cutting the bottom edge of the bag to be upwardly concave and by thereafter pulling the edge straight, so that the bag sides are raised in relation to the middle part of the bag, and by attaching the thus straightened bottom edge of the bag to a strip fitted inside the bottom end of the bag and including channels for removing condensation. Now the top and bottom ends of the bag can be essentially symmetrical to each other.

According to a preferred embodiment of the invention, the liquid feed channel arrays of the top end of the heat exchanger are included in elements that are arranged in between the bags, so that the liquid channels are located partly or wholly underneath the strips provided inside the bags and bordering the steam channels. This enables a compact structure where the strips and the elements containing liquid channels are designed to be well matched, and where the strips are supported by said elements. Any notches or grooves for binding the strips and elements together are not needed in the structure, and the structure is easy to compile and easy to dismantle, for instance in order to replace the bags.

Another object of the invention is a method for constructing a heat exchanger comprising bags made of film material, characterized in that the top edge of each flat, essentially rectangular bag is cut to be concave, that inside said edge there is fitted a straight strip comprising steam channels leading to inside the bag, that the top edge of the bag is pulled straight by bending the bag, so that the middle part of the bag is raised in relation to the sides thereof, and is now, after straightening, fastened to the strip provided inside the bag, and that the bags are compiled, together with plate-like elements containing liquid channels and arranged in between the bags, to form a package bound together and incorporating the heat exchanger, in which package heat is transferred from the steam located inside the bags to the liquid flowing on the outer surfaces of the bags.

Figure 2:
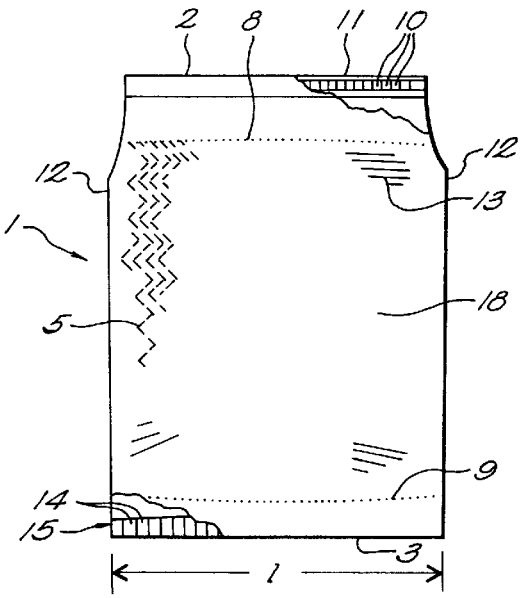
Figure 3:
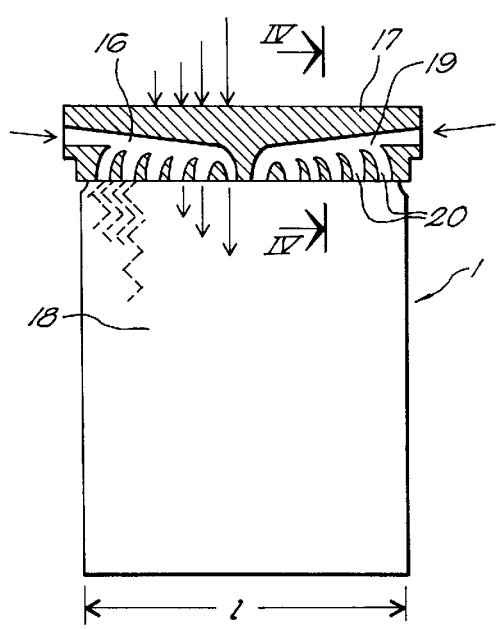
Figure 4:
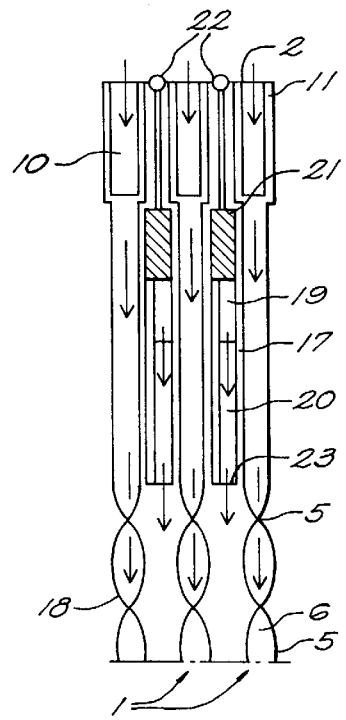

The invention is explained in more detail below, with reference to the appended drawing wherein:

FIG. 1 illustrates a bag belonging to the heat exchanger according to the invention, prior to fastening at its top and bottom end the strips containing steam feed and condensate removal channels, FIG. 2 illustrates a bag according to FIG. 1, the top end whereof is provided with a strip comprising steam feed channels, and the bottom end is provided with a strip comprising condensate removal channels, FIG. 3 illustrates the bag as part of a heat exchanger provided with liquid and steam channel arrays, the bag being cut at the liquid feed channels located at the top end of the bag, and FIG. 4 shows a cross-section of three adjacent bags of the heat exchanger, with connected liquid and steam feeding channels, along the line IV—IV of FIG. 3.

A single heat transfer element in a heat exchanger according to the example is a bag 1 made of some flexible film material, such as plastic film, as is seen in FIG. 1. Generally speaking the bag 1 is rectangular, but at the top and bottom edges 2, 3 it is cut to be concave, so that the depth h of the curves formed at both edges is in this case about 3% of the width L of the bag in straight form, i.e. when it is not inflated. Moreover, the top corners 4 of the bag are deformed by cutting pieces off. The pair of films forming the bag 1 is seamed together by means of vertically proceeding, zigzagging seams 5, which divide the inside of the bag into vertical sections 6 serving as steam channels. At regular intervals the seams 5 have breaks 7, at which adjacent sections 6 are interconnected. In the flat bag 1 according to FIG. 1, which bag is not yet provided with strips in order to create the required channel arrays, the seams at the top end of the bag all begin on the same horizontal level, indicated by the dotted line 8, and end at the bottom end of the bag at the same horizontal level, indicated by the dotted line 9.

According to the invention, the bag 1 is provided with a strip 11 attached at the top end 2 of the bag, in between opposite films, said strip comprising steam channels 10 leading to inside the bag, as is illustrated in FIG. 2. The fastening of the strip 11 is performed by straightening the concave top edge 2 of the bag, so that the films at the sides 12 of the bag are at the same time allowed to be folded, thus forming mainly horizontal folds 13, and by seaming the strip 11 to inside the straightened edge of the bag. The folds 13 serve as an expansion margin while the bag 1 is under use filled with pressurized heating steam. In connection with the straightening of the top edge 2 and the fastening of the strip 11, the middle part of the bag is raised in relation to the vertical sides 12 thereof, which can be observed in FIG. 2 in that the starting line 8 of the internal seams 5 of the bag is arched to be convex.

In respective fashion, the bag 1 is provided with a strip 15 attached at the bottom end 3 thereof, in between opposite films, said strip comprising condensate removal channels 14 leading out of the bag. The fastening of the strip 15 is carried out by straightening the upwardly concave bottom edge 3 of the bag, by allowing the films at the sides of the bag at the same time to be folded to horizontal folds 13, and by seaming the strip 15 to inside the straightened bottom edge of the bag. As a result of this procedure, the vertical sides 12 of the bag are raised in relation to the middle part of the bag, which in FIG. 2 is seen in that the ending line 9 of heat transfer element seams 5 inside the bag is arched to be concave.

A heat exchanger that can include a large number of bags 1 arranged against each other is compiled by placing in turn bags provided with strips 11, 15 and elements 17 containing liquid feed channels 16 against each other and by binding them together in order to form a package as is illustrated in FIG. 4. FIG. 3 shows a cross-section of a single element 17 containing liquid channels, through which element the liquid to be evaporated is fed onto the outer surfaces 18 of two adjacent bags, said surfaces being located against each other and serving as heat transfer surfaces. The feeding of liquid takes place from the sides of the heat exchanger to the diagonally downwards inclined feed channels 19, which are divided into vertical distribution channels 20 distributing the liquid onto the heat transfer surfaces 18, as is indicated by means of the arrows in FIG. 3. The heating steam, which is economically obtained evaporation steam, heated and pressurized in a compressor, is fed from the top of the heat exchanger to the steam channels 10 provided in the strips 11, from which the steam proceeds to inside the bags 1 and is condensated into liquid in the zigzagging vertical channels 6 bordered by the seams 3. The expansion margin required by the steam channels 6 inside the bags is created by means of horizontal folds or corrugations 13 realized in the bag according to the method of invention. Said folds or corrugations are smoothed out when the bag is inflated.

The structure of the members that form the liquid and steam feeding channel arrays in the heat exchanger according to the invention is best seen in FIG. 4. The liquid feed channels 19, 20 are included in the narrow, plate-like elements 17 that are closed in the sideways direction and provided at the top with stepped shoulders 21, said shoulders supporting the steam feeding strips 11 between the elements provided inside the bags 1. Above the shoulders 21, the elements 17 comprise thin plate-like parts that are located in between the strips 11 and extend as far as the rounded ends 22 of the elements. The strips 11 are located so that the steam channels 10 are as a whole located above the liquid channels 19, 20. The top edges 2 of the bags made of film material are essentially located on the level of top end of the strips 11, and the film pairs of the bags are at their top end located in between the liquid feed elements 17. The internal seams 5 of the bags and the sections 6 start, according to FIG. 4, at the bottom edge 23 of the elements 17. FIG. 4 includes arrows that indicate the feeding of steam to inside the bags 1 and the feeding of steam via the channels 19, 20 onto the heat transfer surfaces 18 of the bags.

It is apparent for a man skilled in the art that the various modifications of the invention are not limited to the example described above, but may vary within the scope of the appended claims.

We claim:

1. A heat exchanger comprising:
    a plurality of bags (1) made of film material transferring heat from steam condensed inside the bags to liquid evaporated on outer surfaces (18) of the bags, and
    feed channel arrays (10, 16, 19, 20) located at top ends of the bags for distributing the steam and liquid onto internal and external heat transfer surfaces of the bags, respectively, wherein
    an essentially straight strip (11) is fitted within the inside of each bag at the top end thereof, the straight strip bordering steam channels (10) of the feed channel arrays; and each bag having a concave top edge, whereby straightening of the concave top edge raises a middle part in relation to sides (12) of the bag, and the straight strip being fastened to the straightened top edge to improve the inflatability of the bag.

2. A heat exchanger according to claim 1, wherein a depth (h) of the curve formed by the concave top edge (2) is about 1–4%, advantageously about 2–3% of a width (L) of an uninflated bag.

3. A heat exchanger according to claim 1 or 2, wherein each bag is formed by a pair of films having a plurality of vertically proceeding seams (5) which divide the inside of the bag into a plurality of vertical sections (6) respectively.

4. A heat exchanger according to claim 3, wherein the vertical seams (5) proceed in a zigzagging fashion and comprise interruptions (7) at which adjacent vertical sections (6) are fluidly connected to each other.

5. A heat exchanger according to claim 1 or 2, comprising each bag having a concave bottom edge (3), whereby straightening of the concave bottom edge raises the sides (12) of the bag in relation to a middle part thereof, and a strip (15) being fastened to the straightened bottom edge inside the bag, the strip (15) having condensate removal channels (14).

6. A heat exchanger according to claim 1, comprising elements (17) forming liquid channels (16, 19, 20) of the feed channel arrays provided at the top end of the heat exchanger in between adjacent bags, the liquid channels being partly or wholly located underneath the straight strips bordering the steam channels.

7. A heat exchanger according to claim 6, wherein each bag is formed by a pair of films having a plurality of vertically proceeding seams (5) which divide the inside of the bag into a plurality of vertical sections (6) respectively, and the liquid channel arrays (16, 19, 20) are formed of plate-like elements (17), and the vertical seams (5) inside the bags (1) extend to a bottom edge (23) of the elements (17) or in between the elements (17).

8. A heat exchanger according to claim 1 or 6, wherein liquid channels (16, 19, 20) of the feed channel arrays are formed in separate plate-like elements (17) closed at the sides, said elements distributing the liquid fed to the sides of the bags (1) evenly onto the outer surfaces (18) of the bag.

9. A method for constructing a heat exchanger comprising bags (10) made of film material, comprising:

cutting a concave top edge (2) of each flat, essentially rectangular bag (1);

inserting a straight strip (11) inside the concave top edge, the straight strip (11) comprising steam channels (10) leading to inside the bag;

pulling the top edge of the bag straight by bending the bag, so that a middle part is raised in relation to sides of the bag:

fastening the straightened edge to the straight strip provided inside the bag; and compiling the bags together with plate-like elements (17) comprising liquid channels (16, 19, 20) and fitting the elements between adjacent bags, into a package bound together to form the heat exchanger, wherein the heat is transferred from steam inside the bags to liquid flowing on outer surfaces thereof.

10. A method according to claim 9, wherein the concave top edge (2) of the bag (1) is formed by cutting an arch having a depth (h) of about 1–4%, advantageously about 2–3% of a width (L) of an uninflated bag.

* * * * *